United States Patent [19]
Mauduit

[11] Patent Number: 6,040,577
[45] Date of Patent: Mar. 21, 2000

[54] CHOPPERLESS OPERATION OF A THERMAL INFRARED RADIATION SENSOR SYSTEM BY APPLICATION OF HEAT PULSES TO THERMALLY ISOLATED PIXEL SENSOR ELEMENTS

[76] Inventor: Nicolas Mauduit, 9 rue Berthollet, 79005 Paris, France

[21] Appl. No.: 08/907,809

[22] Filed: Aug. 8, 1997

Related U.S. Application Data

[60] Provisional application No. 60/023,707, Aug. 8, 1996.

[51] Int. Cl.$^7$ ............................................. H01L 27/146
[52] U.S. Cl. ..................................... 250/338.1; 250/338.3
[58] Field of Search ............................... 250/338.1, 338.3

[56] References Cited

U.S. PATENT DOCUMENTS

| | | | |
|---|---|---|---|
| 5,075,549 | 12/1991 | Pines | 250/332 |
| 5,367,167 | 11/1994 | Keenan | 250/338.4 |
| 5,486,698 | 1/1996 | Hanson et al. | 250/332 |

*Primary Examiner*—Constantine Hannaher
*Assistant Examiner*—Andrew Israel
*Attorney, Agent, or Firm*—Fuess & Davidenas

[57] ABSTRACT

Highly thermally isolated pixel-array radiation sensor elements, preferably each (i) KTN material with (ii) an optional radiation-wavelength-tuned absorption coating (iii) suspended above a common substrate by surface micromachining, are continuously illuminated with thermal radiation from a scene so as to each come to an associated thermal equilibrium temperature, and so as to each produce an associated electrical signal. Each and every sensor is occasionally, preferably periodically on the order of seconds, momentarily, typically on the order of milliseconds, subjected to a thermal pulse, preferably as is generated by discharge of an associated local capacitor into a typically polysilicon local resistor. In accordance with the material used, and the "gain" of the thermal sensor element, the heat pulse will produce a large change in the electrical signal from which charge the equilibrium temperature, even if very small and even if resulting from long-wavelength low-energy thermal radiation, is accurately deduced. A sensor element typically 80 $\mu$m square typically has thermal conductivity in the range of range of $6 \times 10^{-13}$ to $8 \times 10^{-13}$ W/° K., and heat capacity in the range of $4 \times 10^{-14}$ J/° K. to $7 \times 10^{-14}$ J/° K.

16 Claims, 5 Drawing Sheets

| MATERIAL | $p(10^{-4} Cm\ K^{-2})$ | DIELECTRIC PERMITTIVITY $\varepsilon$ | TAN $\delta$ |
|---|---|---|---|
| ATGSAs | 7.0 | 32 | 0.01 |
| SBN-50 | 5.5 | 400 | 0.003 |
| PZ/PT | 3.8 | 250 | 0.01 |
| $KT_{0.65}N_{0.35}$ | 400 | 10000 | 0.05 |

CHOPPERLESS OPERATION OF A THERMAL INFRARED RADIATION SENSOR SYSTEM BY APPLICATION OF HEAT PULSES TO THERMALLY ISOLATED PIXEL SENSOR ELEMENTS

REFERENCE TO RELATED PATENT APPLICATION

The present application is related to, and claims the benefit of priority of, U.S. Provisional Patent Application Ser. No. 60/023,707 filed Aug. 8, 1996. The inventor of this related application is the selfsame inventor of the present application (regardless of any typographical error in the inventor name within the related application).

BACKGROUND OF THE INVENTION

1. Field of the Invention

The present invention generally concerns operation of thermal infrared (IR) radiation sensors.

The present invention particularly concerns operating arrayed thermal infrared (IR) radiation sensors other than by use of a light chopper to periodically modulate, or interrupt, incoming light radiation so as to cause the sensors to produce an alternating current electrical signal, as is conventional. Instead, the present invention concerns operating arrayed thermal infrared (IR) radiation sensor elements by (i) continuously illuminating the arrayed sensor elements with radiation from a scene, each arrayed sensor element coming to an equilibrium temperature corresponding to an associated pixel of the scene, and (ii) occasionally or periodically applying a transient heat pulse to momentarily displace each sensor element from equilibrium.

2. Description of the Prior Art

2.1 General Prior Art Radiation Sensors

Classical uses of thermal radiation sensors include (i) military applications in surveillance, for example in infrared night vision and/or intruder detection; (ii) civilian applications in non-contact temperature measurement, for example in remote fire alarms, process control, and quality analysis; and (iii) medical applications, for example in burn healing analysis.

The two main methods of sensing infrared (IR) radiation are either (i) to use the incident photon flux to excite carriers within a material (i.e., photon detection), or (ii) to use a substance with a strongly temperature dependent property (i.e., thermal detection).

Generally, photon detectors tend to exhibit a higher speed of response than do thermal detectors. Photon detectors also exhibit good quantum efficiency up to their cut-off wavelength, which is determined by the energy of the corresponding transition. The transition sets the level of cooling required: the lower the energy band gap of the transition that is responsible for photon sensing, the longer the radiation wavelengths that can be detected. However, the temperature of the photon sensor must also be kept low so that the noise corresponding to the temperature generated carriers does not dominate the signal corresponding to the photon generated carriers. Typically, photon sensors able to detect incident radiation of 14 $\mu$m wavelength need to be cooled to liquid nitrogen temperature (77° K.) or lower.

Thermal detectors tend to he slower that photon sensors because heating and cooling of a macroscopic sample is a relatively slow process. However, these thermal effects do not depend on the nature of the incident radiation that is absorbed by or coupled to the thermal sensing element. In many instances coatings are used to enhance absorption in a portion of the spectrum that is of particular interest. Some thermal sensors can operate over a wide temperature range (though cooling generally improves their performance), while, depending on the properties of the material, other thermal sensors must be maintained within a temperature window.

The ability to operate at or close to room temperature is an important characteristic of low-cost and/or low-weight thermal sensors that do not take advantage of cryogenic cooling. Two popular kinds of thermal sensors are 1) the bolometer and 2) the pyroelectric sensor.

The bolometer can be considered to be a resistor endowed with a resistance that varies with temperature. This variable resistance can be measured with appropriate circuits corresponding to the magnitude of the resistance and the change in resistance. Bolometers are often used in staring arrays (i.e., without any such chopper of the incident radiation as will be discussed).

Using a ferroelectric material can lead to two readout mechanisms: 1) the pyroelectric effect, and 2) the dielectric effect (also termed "induced pyroelectricity"). In both cases the sensor can be apprehended to serve as a capacitor.

The dielectric effect relies on the fact that the dielectric permittivity $\epsilon$ of the sensor's material varies with temperature. Accordingly, once an applied bias has charged the sensing capacitor, a temperature change results in a signal voltage across the element. This mode of operation is often called a "dielectric bolometer".

The pyroelectric effect results in the release of charges across the sensing capacitor. When a pyroelectric element of area A and pyroelectric coefficient p undergoes a change of temperature $\Delta T$, an amount of charges $p \cdot A \cdot \Delta T$ is generated. (Conventionally, under 0 applied field and below the Curie temperature $T_c$, the pyroelectric coefficient $p=dP_s/Dt$, where $P_s$ is the spontaneous polarization of the ferroelectric material). The charges can be sampled directly by an electrometer type mechanism, as the voltage across the element, or as the current resulting from connecting the electrodes to an external circuit.

In an infrared radiation sensing system, the radiation coming from a scene or an object are imaged onto thermal sensors formed as an array of pixels. Each sensor within the sensor array senses radiation of a magnitude related to the amount of radiation emanating from the corresponding portion of the scene.

When the radiation sensors employ the pyroelectric effect, surface charge recombination and readout leakage tend to cancel out the effect over time. Accordingly, an alternating, AC, sampling mode is necessary. Other types of sensors (e.g., bolometer) have also been used in AC mode.

The AC mode is realized by chopping the incident radiation, meaning that this radiation is from time to time attenuated or, most commonly, interrupted. The input radiation signal to the array is thus alternating, or AC. The thermal response of the radiation sensors within these conventional, chopped, systems is typically linear with temperature. All the pixel sensors thus commonly oscillate approximately around the same equilibrium temperature that is determined by (i) the incident radiation, and (ii) thermal coupling of the sensors with the substrate. The AC electrical signals produced by the sensors in response to the chopping are usually fed into differential amplification circuitry, which helps to reduce the amount of noise in the system compared to staring arrays that operate in DC mode.

The problem with so chopping the incident radiation is that some radiation is lost and never reaches the sensors, reducing the sensitivity of the system. The proposed invention addresses the problem associated with using thermal infrared sensors that are operated in conjunction with a light chopper that modulates the incoming radiations to produce an alternating signal.

It will be seen that, when the present invention is used, a cumbersome chopper is no longer necessary, yet the corresponding sensor system will retain all the advantages of AC sampling, and some other characteristics will be improved as well.

2.2 Specific Prior Art Radiation Sensors

A system concerned with like objects of thermal radiation sensing as is the present system is shown and described in U.S. Pat. No. 5,486,698 to Hanson, et. al. issued Jan. 23, 1996 for a THERMAL IMAGING SYSTEM WITH INTEGRATED THERMAL CHOPPER and assigned to Texas Instruments, Incorporated (Dallas, Tex.). The Hansen, et al. patent concerns a thermal imaging system that contains a focal plane array including a plurality of thermal sensors mounted on a substrate. The focal plane array generates both a reference signal which represents the temperature of the substrate and a biased signal corresponding to the total radiance emitted by a scene. Electronics process the reference signal and the biased signal to obtain an unbiased signal representing radiance differences emitted by objects in the scene. A thermoelectric cooler/heater may be provided to optimally adjust the temperature of the substrate to improve overall image quality. Each thermal sensor contains an electrode that electrically couples the thermal sensor to the substrate and also allows the thermal sensor to deflect, contact, and thermally shunt with the substrate.

More remote to the present invention, U.S. Pat. No. 5,302,830 to Shivanandan—issued Apr. 12, 1994 for a METHOD FOR MEASURING THERMAL DIFFERENCES IN INFRARED EMISSIONS FROM MICRO DEVICES and assigned to General Research Corporation (Vienna, Va.)—describes a method for measuring thermal differences in infrared emissions from semiconductors. In the method an image sensor includes an array detector having a plurality of detector elements which produce signals corresponding to semiconductor radiation emission focused thereupon by an optical lens system. At least one bandpass filter is utilized to substantially filter that portion of the semiconductor radiation emission having wavelengths greater than 5 micrometers. The detector element signals are processed to identify performance degrading phenomena occurring in the semiconductor device.

U.S. Pat. No. 5,546,041 to Szajda—issued Aug. 13, 1996 for a FEEDBACK SENSOR CIRCUIT and assigned to the Massachusetts Institute of Technology (Cambridee, Mass.)—concerns a circuit for sensing a parameter such as temperature. The circuit has a single current source and a mismatched diifferential pair for providing two different currents at a desired current ratio. Each current is provided to a current control element and a sensing element, each of which may be diodes. An operational amplifier closes the loop and feeds back a signal from the input of the current control elements to the differential pair to hold the desired current ratio constant. Chopper circuitry is employed with the amplifier to reduce the offset and low frequency noise contribution of the amplifier.

SUMMARY OF THE INVENTION

The present invention contemplates a chopperless readout mechanism for arrayed radiation, typically infrared light radiation, thermal sensor elements. In the chopperless readout mechanism (infrared, light) radiation emanating from a scene is constantly applied to the sensor elements of a pixel array, meaning that the radiation input signal is DC.

The invention further contemplates arrayed thermal infrared radiation pixel sensor elements that are thermally-isolated from a substrate, and from each other, by a surface micromachined suspension to each pixel element, which suspension offers low heat conductance from each pixel element to the substrate.

The invention still further contemplates selective application of momentary energy, or heat, pulses to each individual one of a large number of arrayed thermal-radiation-sensing pixel elements by discharge of an associated capacitor through an associated resistor, therein to heat the one element (only).

1. Chopperless Operation of Thermally-Isolated Arrayed Thermal Infrared Radiation Pixel Sensor Elements by Application of Heat Pulses to the Elements The proposed mechanism relies on high thermal isolation between pixel sensor elements, such as is realized by surface micromachining to create pixel sensor elements suspended above a substrate, so that the equilibrium temperature of each pixel sensor element can vary separately from each and every other sensor element according to the incoming radiation received by each element. The different amounts of radiation emanating from different portions of the scene which are at different radiation temperatures leads to different pixel sensor element equilibrium temperatures (a pixel sensor element receiving relatively more, or relatively more energetic, radiation will have a higher equilibrium temperature).

In the system of the present invention, the temperature of each portion of the scene or object is deduced from differences in the temperature of each pixel sensor element, and not from such differences in the magnitude of temperature variations resulting from any alternating, AC, variation in the input radiation (as is characteristic of conventional, chopped, systems).

Further in accordance with the present invention, a heat pulse is from time to time, and is normally periodically, momentarily applied to each pixel sensor element in order to measure the effect thus caused. The momentary heat pulse causes; the pixel sensor element to momentarily vary from its equilibrium temperature (which equilibrium temperature is related to the temperature of the corresponding portion of the scene or object). When a heat pulse of the same energy is applied to two pixel sensor elements each at a different equilibrium temperature, then the magnitude of the electrical signal produced by each (corresponding to its temperature excursion) will be related to the characteristics of the material from which the sensor element is made. These electrical signals can vary rapidly with temperature for selected materials; meaning that a very large effect will be produced, in accordance with the "gain" of the sensor element, by the momentary addition of the extra energy.

Therein lies the great power of the present invention: a very large electrical signal is produced from which signal the equilibrium temperature of a thermal sensor element may be accurately determined while none of the incident radiation (infrared, light) energy is ever wasted.

For example, when KTN material is used for sensor elements operating in the pyroelectric mode, the pyroelectric coefficient p can E by 100% over a range of one degree, and when used in induced pyroelectric mode the dielectric permittivity can vary by 100% over a range of a few degrees! Hence, and even though the input radiation input signal is DC without being chopped, the present invention makes it possible to take advantage of such sensitive pyroelectric materials by adding an AC thermal variation on top of the uninterrupted input radiation.

In general, the material composition or operating temperature (with respect to the Curie temperature $T_c$) are different for optimum sensor operation in one of the two modes: i.e., the pyroelectric mode below $T_c$, or the dielectric mode around $T_c$. (A combined use of the pyroelectric effect and the induced pyroelectric effect can be taken advantage of by use of an electric field E polarizing the sensor element appropriately. Such a field generally has the effect of broadening and shifting the response peak of the sensing material with respect to temperature.)

However, KTN and similar ceramics, in particular, presently appear to be compatible both in deposition methods and compatibility with monolithic integration. Moreover, by varying the composition of the material, a suitable range of $T_c$ for operation of the sensor element can be selected. Therefore it is usually a relatively straightforward matter to select and operate a sensor element that will, when operated in accordance with the method of the present invention, show a very large detectable effect over a broad range of input radiation, including such low level thermal radiation as is normally more difficult to measure.

2. Thermal Infrared Radiation Pixel Sensor Elements Thermally-Isolated by Their Surface Micromachined Suspensions Further in accordance with the present invention each of a typically large number of thermal-radiation-sensing pixel sensor elements that are typically arrayed upon a common substrate is thermally isolated from the substrate by a surface micromachined suspension. The surface micromachined suspension leaves the sensor element suspended in space with but minimal necessary mechanical and electrical connection to the substrate, and thus also to other sensor elements. The suspension offers low heat conductance from each pixel sensor element to the substrate, and from one pixel sensor element to the next.

3. Selective Application of Momentary Energy, or Heat, Pulses to Thermal-Radiation-Sensing Pixel Sensor Elements by Discharge of an Associated Capacitor Through an Associated Resistor Still further in accordance with the present invention each of a large number of thermal-radiation-sensing pixel sensor elements is typically integrally constructed with (i) an associated capacitor holding electrical charge and (ii) an associated resistor. The capacitor is selectively electrically connected to, and discharged through, the resistor, therein to selectively apply a heat pulse to the sensor element. The selective electrical connection may be through a transistor that is under the control of, for example, a signal from a computer or a counter or the like.

These and other aspects and attributes of the present invention will become increasingly clear upon reference to the following drawings and accompanying specification.

BRIEF DESCRIPTION OF THE DRAWINGS

FIG. 4b is a diagrammatic representation of a finite element thermal analysis of the preferred, surface-micromachined-technology, thermal pixel sensor element shown in FIG. 4a.

FIG. 7b is a graph showing the characteristics of the band absorption coating, compatible with the preferred thermal sensor element of the present invention, previously shown in FIG. 7a.

DESCRIPTION OF THE PREFERRED EMBODIMENT

The proposed invention deals with problems resultant from modulating incoming thermal radiation to thermal infrared radiation sensors with a light chopper in order to produce an alternating signal (AC) electrical output from each sensor. Among other problems, incoming radiation is wasted during the time that the sensor(s) is (are) occluded, reducing sensitivity.

1. The Performance of Previous, Chopped, Thermal Sensing Systems

Figure 1:
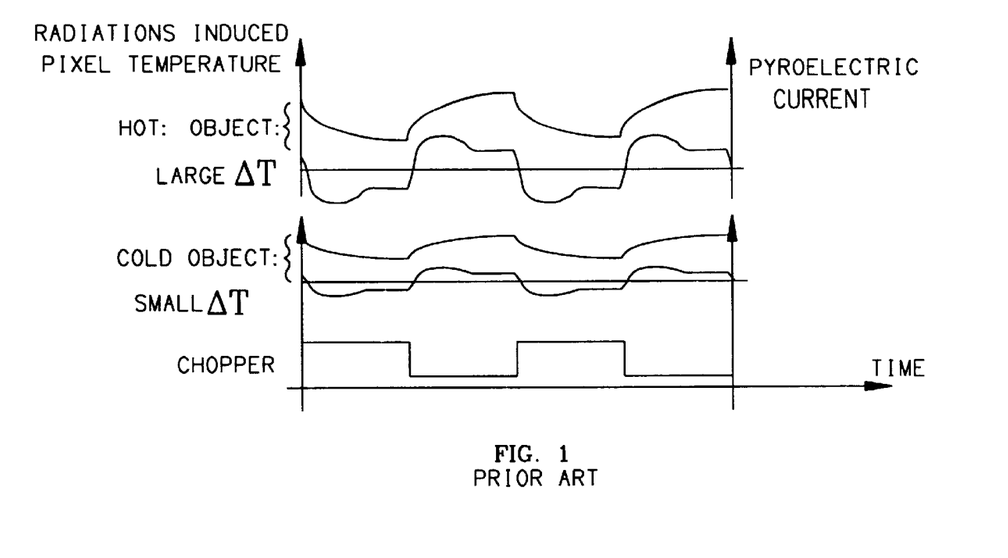
FIG. 1 is a graph showing the response of a prior art thermal sensor to an applied AC radiation signal.

The signals of a prior art, chopped, thermal radiation sensing system are shown in FIG. 1. FIG. 1 shows the response of a single prior art thermal radiation sensor element to an applied AC radiation signal where the horizontal axis is time, and where the vertical axis is "Pyroelectric current" I, I=A p Dt/dt or the generated current for the pyroelectric case.

The incoming radiation is modulated by a cropper to induce in the thermal radiation sensor element a change of temperature of a magnitude corresponding to that of the portion of the scene it is imaging. The "Chopper" signal, typically a square wave, is used to selectively gate, normally by mechanical means such as a rotating disk or other shutter, radiation to the thermal sensor element. The AC "Pyroelectric current" so produced is proportional to "Radiation induced pixel temperature", and is illustrated for two (2) exemplary pixels which respectively receive radiation from a "hot object", making for a "large ΔT", and from a "cold object", making for a "small ΔT". The resulting AC "Pyroelectric current" is usually fed into a differential amplification circuit. This scheme helps to reduce the amount of noise in the system compared to staring arrays that operate in the DC mode.

When the pyroelectric effect is used to sense thermal radiation, this AC sampling mode is absolutely necessary because surface charge recombination and readout leakage cancel out the pyroelectric effect over time. Other types of sensors, for example bolometers, have also been operated in AC mode by use of a chopper.

In the prior art infrared chopped-input-(radiation)signal sensing system illustrated in FIG. 1 the radiation coming from a scene or an object is imaged onto an array of thermal sensor elements forming an array of pixels. Conventional chopped readout mechanisms for these arrayed thermal sensor pixel elements result in an AC input radiation signal. This AC signal has a magnitude related to the amount of radiation emanating from a corresponding portion of the scene, as is illustrated for each of the two signals one from a "hot object" and one from a "cold object" in FIG. 1. The thermal effect of the sensor elements used in these conventional prior art chopped systems can be linear with temperature, and often all the pixel sensor elements oscillate approximately around the same equilibrium temperature which is determined by the thermal coupling of the elements with the substrate.

Figure 2A:
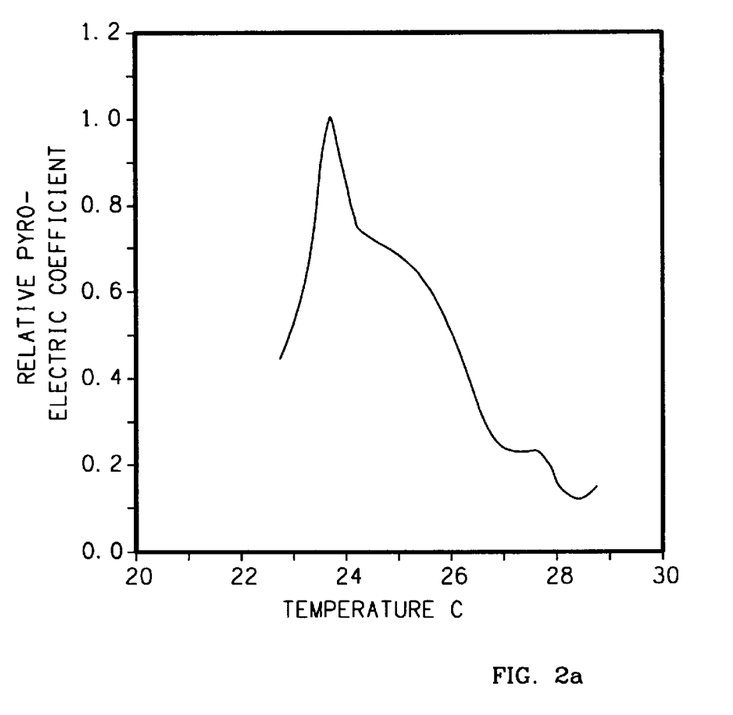
FIG. 2a is a graph illustrating the relative pyroelectric coefficient of KTN material versus temperature for operation below $T_c$.
Figure 2B:
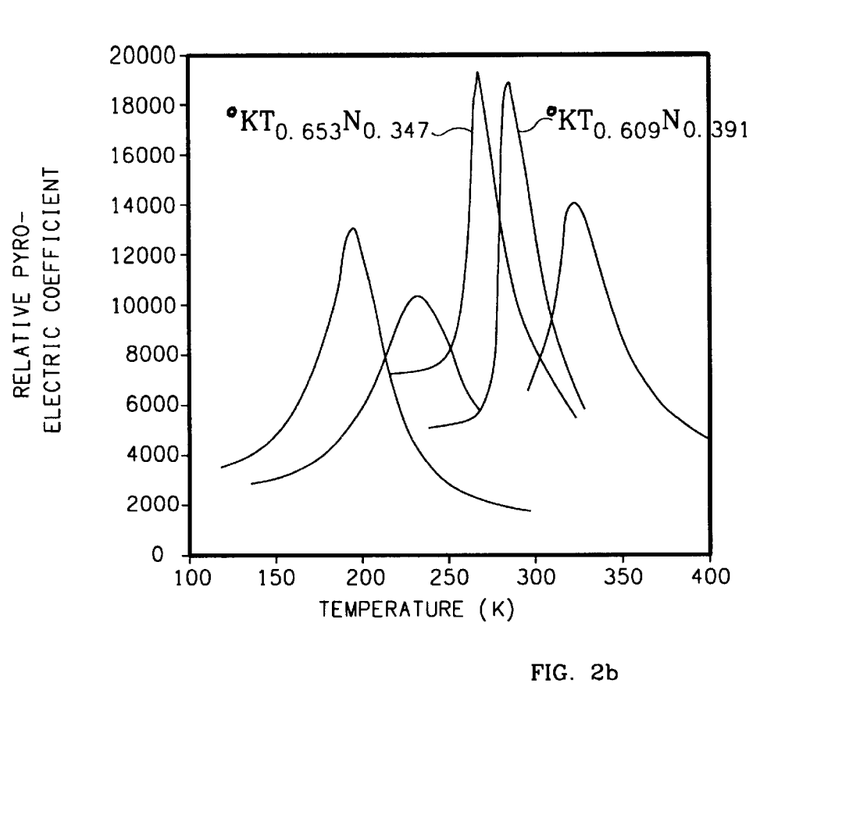
FIG. 2b is a graph illustrating the relative dielectric constant, or dielectric permittivity, of KTN material versus temperature now for operation around $T_c$.

2. General Theory of Chopperless Operation of Arrayed Thermal Infrared Radiation Sensor Elements by Application of Heat Pulses When the Sensor Elements Are Thermally Isolated The chopperless operation of arrayed thermal infrared radiation sensor elements by the application of heat pulses to the sensor elements as are substantially thermally isolated from each other, and from a common substrate, is shown in FIG. 2 and in subsequent figures.

When using a chopperless readout mechanism, or system, of the present invention, the radiation emanating from a scene is continuously applied to the thermal sensors commonly formed as a pixel array. In other words, the input (radiation) signal is constant, and DC. The mechanism and system of the present invention relies on the modern capability to fabricate highly thermally isolated sensor, which is always desirable in any case. There presently exist separate mechanical structures to support each arrayed sensor, such as surface-micromachined-suspended pixel sensor elements, permitting that the equilibrium temperature of each pixel sensor can vary maximally from nearby sensors according to the incoming radiation that it alone receives. The different amount of radiation emanating from different portions of the scene that are at different temperatures leads to different pixel sensor equilibrium temperatures: a pixel sensor receiving relatively more radiation will have a relatively higher equilibrium temperature.

In the present invention, the temperature of each portion of the scene or object is deduced from these differences in average pixel temperatures, and not from any difference in the magnitudes of temperature variations resulting from a chopped, AC, input radiation signal.

In accordance with the present invention, a heat pulse is applied to each and to every thermal sensing pixel element in order to measure the effect thereby caused. Namely, each thermal sensor pixel element will, in response to the heat pulse, suffer an excursion from its equilibrium temperature (which, it will be recalled, is related to the temperature of the corresponding portion of the scene or object). (The pulse is called a "heat pulse" and not a "cooling pulse", because it is typical for thermal, heat, radiation to be temporarily applied to be much "hotter" than is the radiation from the scene. It can, or course, be imagined that the scene or portions thereof are so "hot" that the excursion in equilibrium temperature of the sensor is to lower, as opposed to a higher, temperature.)

For a heat pulse of the same energy applied to two thermal sensor pixel elements each at a different equilibrium temperature, the magnitude of the signal corresponding to the excursion will be related to the characteristics of the thermal sensor, and of the material from which the thermal sensor is built. Some thermal sensors of certain selected materials produce signal outputs that vary very rapidly with temperature. Therein lies a use of time in a new sense in the present invention: the invention being concerned not only with variation in radiation over time, but with the rapidity of the thermal sensor response thereto.

In the case of KTN, a typical material used to produce infrared (IR) sensors, the characteristics of the material (and, ergo, sensors built of the materials) are shown in FIGS. 2a and 2b. FIG. 2a is a graph illustrating the relative pyroelectric coefficient of KTN material versus temperature for operation below $T_c$. The vertical axis is equivalent to charge collection (e.g., CCD), or current, when the KTN material is used in an operational infrared thermal sensor. FIG. 2b is a graph illustrating the relative dielectric constant, or dielectric permittivity, of KTN material versus temperature now for operation around $T_c$. Exactly where $T_c$ is located for a particular sensor, and the exact curves of variation for excursions in temperature C (under bias), depend upon the composition and the fabrication of each individual sensor.

One thing, however, can immediately be observed in FIG. 2. The scale of the (horizontal) temperature axis is rather fine, and large changes the observed characteristics occur over ranges of but a few degrees C. When used in the pyroelectric mode, the pyroelectric coefficient p of the preferred KTN material can vary by 100% over a range of 1° C.! When the KTN material is used in the induced pyroelectric mode the dielectric permittivity can vary by 100% over a range of but a few degrees.

These strong effects (as well as their rapidity) are made good use of in the present invention where, even though the radiation input signal is DC without being chopped, pyroelectric materials are momentarily (i.e., AC) subject to an additive thermal variation on top of the existing input signal. In other words, AC thermal radiation—strongly preferably in the form of a pulse as opposed to, for example, a sine wave and no longer than is necessary for full response of the thermal sensor pixel element illuminated—is momentarily added on top of the existing continuous, DC, radiation from the scene.

In general, (i) material composition and/or (ii) operating temperature (with respect to the Curie temperature Tc) are different for optimum operation depending upon which operation mode is chosen: pyroelectric below Tc, or dielectric around Tc. KTN and similar ceramics are well controlled in manner of deposition, which manner is generally compatibility with monolithic integration. Accordingly, the range of Tc that can be selected by varying the composition is reasonably well controllable. (Sensors produced as a batch will in any case likely all exhibit nearly the same $T_c$, and if more sensors are within an array then can be fabricated as a single batch, it is always possible to select sensors that are matched in characteristics.)

Figure 3:
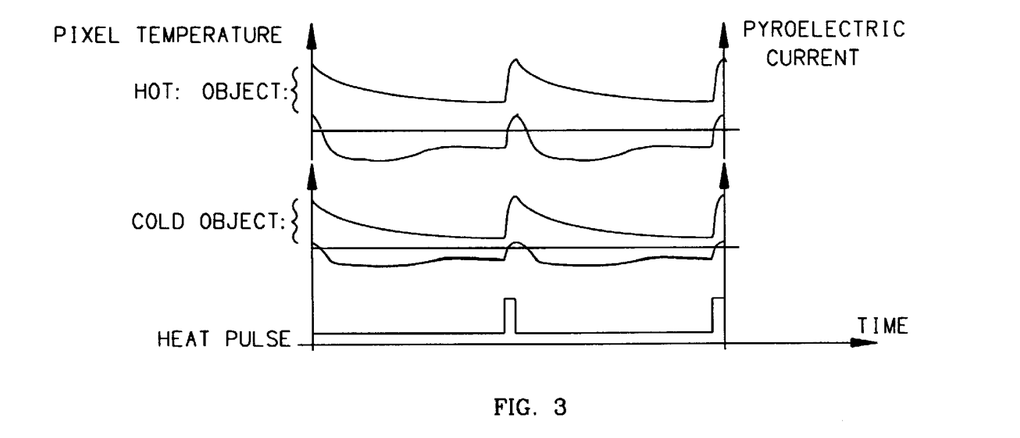
FIG. 3 is a graph illustrating the response of a heat pulse applied to a non-chopped thermal sensor (i.e., always staring at the scene) having non-linear response characteristics.

As a result of these characteristics of KTN, which, although preferred, is only a typical material for use in IR sensors of the chopperless system of the present invention, the output response of a thermal sensor operated according to the present invention will be as illustrated in FIG. 3. FIG. 3 should immediately be compared with the conventional, chopped, mechanism and system previously seen in FIG. 1.

FIG. 3 illustrates the response of a heat pulse applied to a non-chopped thermal sensor (i.e., always staring at the scene) having non-linear response characteristics. As before, pyroelectric current I=A p(T) Dt/dt. The incoming radiation leads to different pixel equilibrium temperatures of the different thermal sensors. Notably, a short heat pulse leads to an increase in pyroelectric current output that is determined by the value of the pyroelectric coefficient at that (particular, thermal equilibrium) temperature.

The heat pulse may be applied to the sensors of the sensor array in various ways. It may be applied independently at the pixel level, for example by locally discharging a suspended capacitor/sensor into a local resistance, making thereby sort of a "micro hot-plate". Alternatively the heat pulse may be applied globally at the array level, using for example a laser or other controllable radiating source.

The frequency and magnitude of the heat pulses, and the substrate temperature, can be used to control the operating thermal range, which also provides a means of rapidly varying the gain of the sensor (for example, to adapt to the radiation conditions).

3. A Particular Exemplary Preferred Practice of the Invention, and Possible Modifications and Variations of this Preferred Practice Ferroelectric ceramics with large non linear thermal characteristics can operate at or close to room temperature. Consider, for example, KTN material already illustrated in FIG. 2. Similarly, highly non-linear bolometers have also been fabricated using superconducting materials, but they usually require cooling well below room temperature.

A critical aspect of the present invention is to obtain a spread of pixel temperatures to map (i) a range of temperatures of interest in the input scene to (ii) an operating range of the sensing material. This mapping of temperatures from the scene can then be translated either up or down using the gain mechanism mentioned above.

Figure 4A:
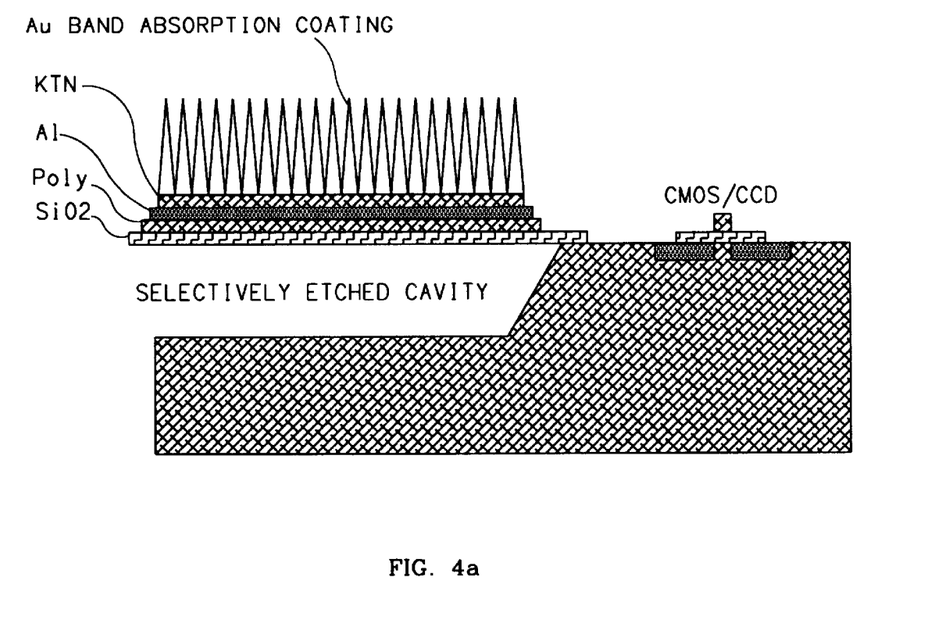
FIG. 4a is a diagrammatic representation of the structure of a preferred surface-micromachined-technology thermal pixel sensor element of the present invention.
Figure 4B:
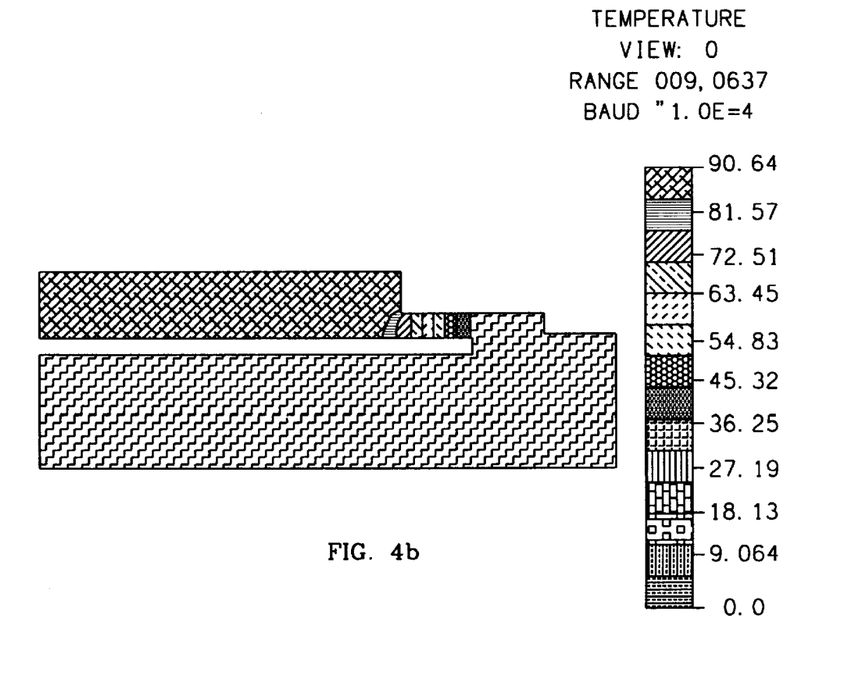

Surface micromachined suspensions as are illustrated in FIG. 4 provide a good solution to the requirements of the present invention. FIG. 4a shows, in particular, the structure of a preferred thermal sensor element, to wit: a cross section of the preferred surface-micromachined-pixel technology. FIG. 4a shows the corresponding thermal gradient for (i) a 30° C. scene black body radiation and (ii) a 20° C. substrate temperature—both of which temperatures are quite useful, and realistic. FIG. 4b shows a finite element thermal analysis of the preferred, surface-micromachined-pixel technology, thermal sensor element shown in FIG. 4a.

Surface micromachined suspensions offer very low heat conductance to the substrate, thereby increasing the spread for a given range of input radiations and providing for high sensitivity operation. (How they are enabled to do this is self evidently obvious in FIG. 4a, where the sensor is substantially thermally isolated from the substrate by an intervening selectively etched cavity.) Witness the thermal analysis shown in FIG. 4b.

Surface micromachined suspension technology also satisfies the dual criteria of (i) ruggedness and (ii) monolithic integration compatibility. This results in low cost, which, along with the removal of the chopper from the conventional IR sensing systems, has proven to be an incentive for implementation of the mechanism and system of the present invention.

Silicon is the substrate of choice for surface micromachining, and the integration of the IR sensors onto the micromachined silicon substrate make available both CMOS and CCD devices for charge storage and amplification. Both packaging costs, and the number of components required for a complete system, are thereby reduced (if not also rendered more inexpensively). Integration can also lead to complementing the IR sensing range by use of CCD photodetectors, which (conventionally) provide a means of detecting in the visible part of the spectrum. This is of great help in the aiming of an IR sensor system, for example. See also, the application described by Y Carts-Powell in "Fusing CCD and IR Images creates color night vision" (Laser Focus World, May 1996).

Since the spread of equilibrium pixel temperatures for a given scene spectrum is governed by the thermal conductance of the pixel suspension, this is determined by the hardware geometry of the suspension and usually cannot be changed after fabrication (unless a means of altering the heat conductance is used, compare U.S. Pat. No. 5,486,693 issued Jan. 23, 1996, for a THERMAL IMAGING SYSTEM WITH INTEGRATED CHOPPER.

The particularly preferred implementation of the invention offers a way to vary the pixel temperature spread for a given range and amount of radiation to be sensed from the input scene. This is achieved by using the sensor itself as part of the heat pulse generating mechanism. As mentioned above, the heat pulse can be generated locally to the pixel with the discharge of the sensing capacitor into a local resistor. Such a local resistor is shown made of polysilicon in FIG. 4. If the dielectric properties of the material vary with temperature (as in FIG. 2), then the amount of charge stored into two capacitors biased at the same voltage but at a different equilibrium temperature will be different, and the energy released when discharging the charges into the suspended resistor will follow. For example, if $\epsilon$ increases with temperature, then a colder pixel will generate a smaller readout heat pulse than a warmer pixel, which results in spreading the temperature difference between these two pixels after one or a number of readout heat pulses. This is in fact a special use of the induced pyroelectric effect.

Figure 5:
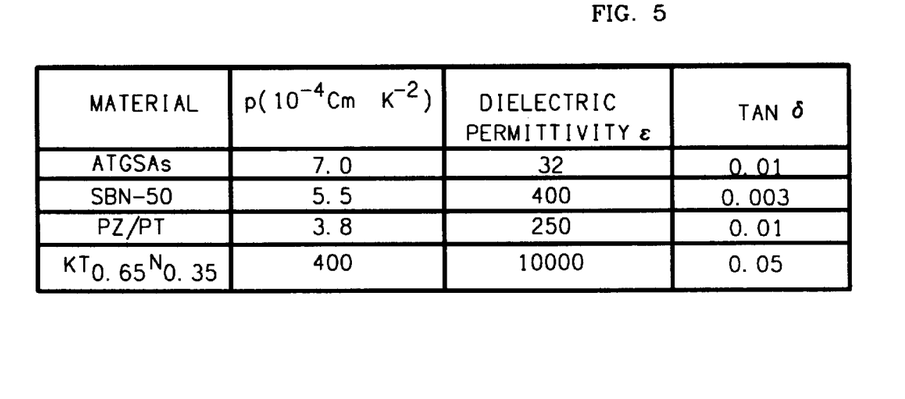
FIG. 5 is a Table 1 setting forth the characteristics of selected pyroelectric materials usable in a thermal sensor element operated in accordance with the chopperless, additive-radiation-pulse, method of the present invention.

The use of material with large pyroelectric characteristics has other advantages; by providing a large output response (high responsiveness) from a small readout heat pulse, the constraints on the noise margin of the amplification stage of the readout circuitry are relaxed, yet flexibility of varying the energy of the beat pulse (for example, by varying the bias voltage applied to charge the capacitors) is preserved. Again, KIN compares favorably against other pyroelectric materials. See Table 1 of FIG. 5 setting forth the characteristics of selected pyroelectric materials.

When implementing the present invention with a local heat pulse, the electronics (RC) time constant of the proposed mechanism is small: hence the response speed of the system is substantially governed by the thermal time constant of the suspended pixel. When a conservative 80 $\mu$m square sensor of KTN of 0.5 $\mu$m thickness is used, then the RC time constant is in the microsecond ($\mu$sec) range. The characteristics of ferroelectric ceramics and their deposition techniques—R.F. sputtering, spun on sol-gel or organometallic solutions, vapor phase deposition, etc.—permit the fabrication of thin sensors of high capacitance, which has the other advantage of reducing the heat capacity of the pixel compared to other thermal sensing mechanisms!

The thermal time constant follows the ratio of the pixel heat capacitance provided by the thermal conductance of the suspension. The requirement of the present invention that there should strongly preferably be low thermal conductance of the suspension (for spreading the equilibrium temperatures of the pixels) finds a good match with the low heat capacitance provided by ferroelectric ceramic based sensors. For an 80 $\mu$m square sensor of KTN 0.5 $\mu$m thickness, the thermal time constant will serve to limit the frame rate to fall within the millisecond (msec) range. The finite element model of the corresponding pixel indicates a thermal conductivity for the suspension in the range of $6 \times 10^{-13}$ to $8 \times 10^{-13}$ W/° K and a pixel heat capacity in the range of $4 \times 10^{-14}$ J/° K to $7 \times 10^{-14}$ J/K.

Figure 6:
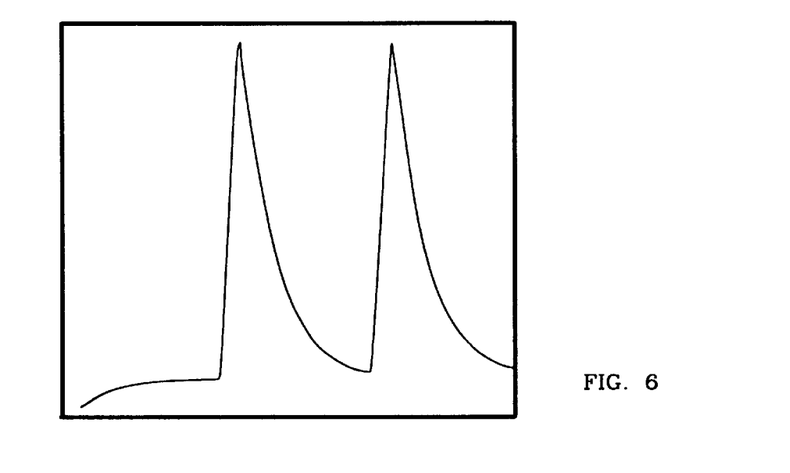
FIG. 6 shows a thermal and electrical simulation of the preferred thermal sensor element, shown in FIG. 4 and constructed of KTN as in Table 1 of FIG. 5, operated in accordance with the chopperless, additive radiation-pulse, method of the present invention.

The thermal modeling and simulation of the preferred thermal sensor is illustrated in FIG. 6. The KTN film is again of 0.5 μm thickness. A single pixel sensor element is again 80 μm square. The capacitance of the sensor element is approximately 500 pF, the resistance approximately 8000 ohms. The temperature rise, $T^{rise}$, is approximately 6 mK for a single 1 V pulse, $\tau_e \sim 4$ μs. The illustrated thermal modeling is for repetitive heat pulses of 40 μW each of 0.3 ms duration, with a $T_{rise} \sim 60$ mK. For the pyroelectric case, simulation indicates that the charge generated each pulse will equal approximately $4 \times 10^6$ electrons. The charge difference for a variation in 1 mK of the average pixel temperature at mid-range is 4,800 electrons, indicating that sensor sensitivity should be of this order or better.

Unlike photon sensors, thermal sensors are not limited by a cut-off wavelength, and are usually used with a wide band absorption coatings to maximize sensitivity. When using a sensing material with high responsiveness (such as described in the above), and to the extent that the input radiation signal is large enough, additional information may be obtained by using band absorption coatings instead.

Figure 7A:
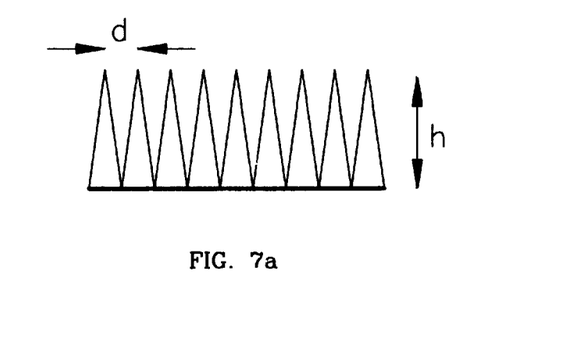
FIG. 7a is a diagrammatic representation of a cross-section of a band absorption coating for a preferred thermal sensor element operated in accordance the chopperless, additive-radiation-pulse, method of the present invention.

FIG. 7a shows a diagrammatic representation of a preferred multi-band absorption coating well suited to, and fully compatible with, an infrared pixel sensor element Implementing the present invention. Such a multi-band absorption coating is discussed in the paper *The optical properties of 'moth Hyde' antireflection surfaces*, S. J. Wilson and M. C. Hutley, Optica Acta, 29, 7, 1982. Such a multi-band absorption coating has heretofore been of little use in thermal sensors because, as will be seen, it depends upon sensitivity of the sensor at such longer wavelengths and lower energies as were, until the chopperless system of the present invention, difficult or impossible to detect.

The characteristics of a preferred multi-band absorption coating compatible with the preferred pixel technology are as follows: It is preferably fabricated with DOE-assisted lithography using e-beam analog resist. It can be etched by laser assisted etching, or RIBE. Surface profile control, or AFM, is useful.

The preferred multi-band absorption coating permits the sensing of multiple bands of radiation in accordance that the pattern is varied upon a thermal detector array (hence its name of "multi-band absorption coating"). It improves reflection of off-band noise radiation, increasing the D* limit. It permits a wide range of incidence angles for use with fast optics (e.g., f/1). Finally, it provides efficient interface, or coupling, to the surface of the sensor.

Figure 7B:
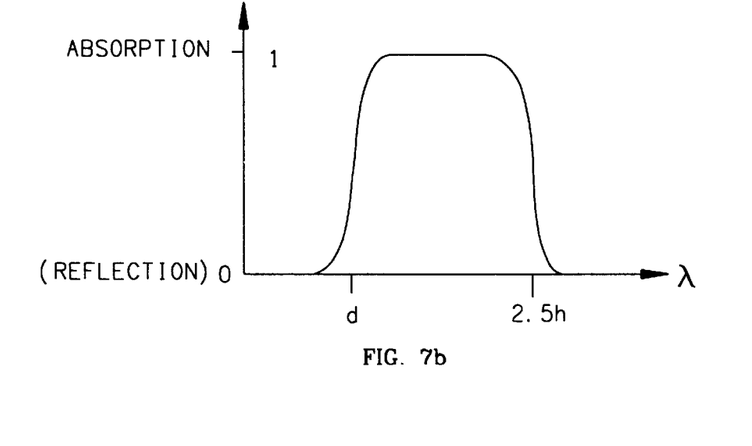

A graph showing the characteristics of the preferred band absorption coating is shown in FIG. 7b. Clearly a radiation bandpass of any desired frequency is obtained by mechanical variation of the spacing d and height h parameters of the coating (shown in FIG. 7a).

Valuable information is gained from multiple band IR sensing as opposed to simple wide band sensing, and may be considered analogous to color, as opposed to black-and-white, vision. The reduction of the absorbed radiation spectrum offers the additional advantage of reducing the amount of absorbed background noise radiation, improving the theoretical detection limit (BLIP mode).

In summary, the most preferred way of practicing the present invention is to take advantage of (i) the strong response of ferroelectric ceramics, such as KTN, that contribute to low beat capacity pixels, (ii) the low thermal conductivity of surface-micromachined suspensions that provide high sensitivity, and (iii) band absorption coatings that permit frequency-sensitive detection while improving sensitivity (within the band). The consequence of all these improvements results in low cost, rugged, infrared thermal sensors that operate near to the BLIP limit at room temperature.

Figure 8:
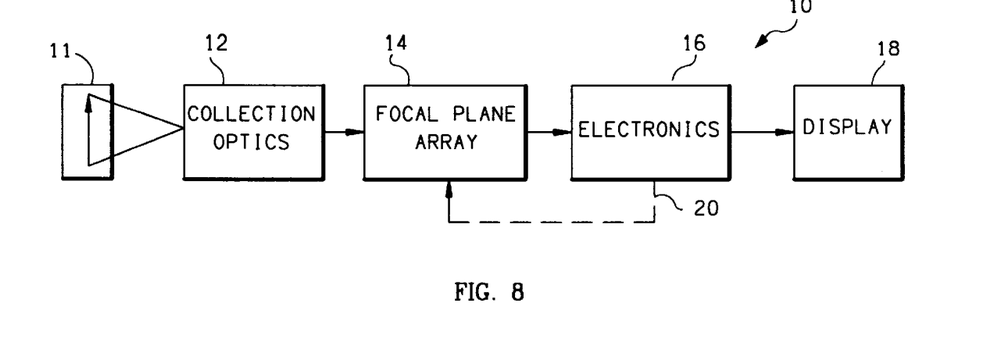
FIG. 8 is a block diagram including the electronics of the thermal sensor system of the present invention wherein heat pulses are applied to thermally isolated thermal pixel sensor elements.

Although a chopperless thermal imaging system in accordance with the present invention uses similar electronic control to predecessor systems, the organization of the complete electronics system is included within this specification for completeness. A block diagram of a thermal imaging system 10 in accordance with the present invention is shown in FIG. 8. During operation of the thermal imaging system 10, infrared radiation from scene 11 is received by collection optics 12 and focused on local plane array 14. Signals from focal plane array 14 are delivered to electronics 16 where they are processed and passed to display 18. At predetermined intervals, the electronics 16 directs the focal plane array 14 to generate a reference signal, as shown functionally by dashed line 20. This much is the same as the previously-discussed prior art U.S. Pat. No. 5,486,698 from which patent the diagram of FIG. 8 is drawn. However, unlike the system of that patent where the reference signal for focal plane array 14 is generated by thermally shunting each thermal sensor to an underlying substrate, in the present invention, as previously explained, the reference signal is generated by causing a heat pulse to the focal plane array 14.

As is conventional, the scene 11 may be any scene of objects that emit thermal radiation. As with all thermal imaging systems (including the system of said prior art U.S. Pat. No. 5,486,698), the system to the present invention is useful when imaging by means of visual wavelengths is unavailable, such as in the dark of when vision is impaired by smoke, dust, or other particles. The system of the invention is, of course, also useful during the day and when vision by means of the visual wavelengths is available. A thermal sensor incorporating the system of the present invention may also be used with a radiometer.

Optics 12 are well known in the art of thermal imaging, and may be any one of a number of systems of lenses. Optics 12 produce a focused image on focal plane array 14, so that focal plane array 14 may detect the radiance of the focused radiation it receives. The lenses are made of material that transmits infrared radiation, such as germanium. The placement of optics with respect to focal plane array 14 is accomplished using well known principles of optical design as applied to thermal imaging systems.

Although preferably comprised of the preferred infrared detector elements already taught, the focal plane array 14 may be made from any number of a wide variety of detectors. The invention may be used with either "staring" or "scanning" detectors. A staring detector is a large area detector onto which the entire image is focused at one and read out electronically. A scanning detector uses a mirror or other means to sweep the signal across the detector one element at a time. Usually, although not necessary for the invention, both types of detectors consist of a plurality of thermal sensors, with the output of each thermal sensor representing a portion of the viewed scene. For example, when a standard cathode ray tube (CRT) display is used, the output of each thermal sensor may represent a single pixel of the total image. The thermal sensors 50 of the system 10 of the present invention may, because of their sensitivity, be particularly beneficial for use in high density arrays and with high density visual displays.

The electronics 16 performs certain operations on the signals received from focal plane array 14. Some of the functions of the electronics 16, such as receiving signals from focal plane array 14 and amplifying a signal representing intensity changes, are well known in the art of thermal imaging. Electronics 16 may include the necessary processing and components for a generating the periodic heat pulse to the focal plane array 14, as is shown FIG. 3.

Display 18 may be a special viewing device, such as a CRT. For some applications, display 18 may function as a radiometer and provide a measurement of the radiant energy incident on focal plane array 14. Depending on the type of display, an additional function of electronics 16 may be to transform the signals from focal plane array 14 into a format for use with display 18. The image on display 18 is typically a visual representation of the radiance image on the focal plane array 14 emitted by the scene 11.

Although not shown in FIG. 1, the thermal imaging system 10 can easily be modified to permit digitization of the image signals so that the signals can be stored and processed as digital data. This requires sampling, storage, and processing devices; all of which are well known in the field of video and graphics processing. Alternatively, the thermal imaging system 10 may function as a radiometer to provide temperature measurements of radiant energy sources present in scene 11.

In operation, the electronics 16 directs the focal plane array 14 to at all times detect the radiance from scene 11 as is focused on its plurality of thermal sensor elements 50 by collection optics 12. Periodically the thermal sensor elements 50 of the focal plane array 14 will also generate a signal offset representing this background radiance plus a signal modulation resulting from the heat pulse. The electronics 16 processes both the normal, and the induced, signals from each sensor element 50 of the focal plane array 14 to generate a signal representative of the temperature of the corresponding pixel element of the scene 11. This signal is either transformed into video data for display 18 and/or stored in memory (not shown) for later processing. The process of establishing the normal, and the induced, signals is repeated either in parallel or in succession for all the pixels of all the frames of video data that are sent to display 18. It should be understood that the present invention contemplates establishing the reference, induced, signals either before or after detections of the normal signals, and periodically re-establishing the reference signal either before or after a predetermined number of normal signals have been received and processed.

The advantages and improvements of the present invention over existing practices are many.

Compared to the system of the previously described U.S. Pat. No. 5,486,698 assigned to Texas Instruments, Inc.—which patent also proposes to modulate the heat actively (by cyclically putting the pixel in contact with the substrate)—the present invention offers the faster cycle time resultant from an electrical RC time constant versus a micromechanical torsion time constant. The present invention offers less electrical noise, being that the electrostatic operation of the pixel is likely to induce parasitic charges. Finally, the system of the present invention offers less sensitivity to vibrations and higher reliability, with no parts in motion.

The chopperless system of the present invention lends itself to cheaper, lighter, and more rugged IR sensor systems than the counterparts using a chopper.

The system of the present invention is compatible with solid state technology, and can be monolithically integrated with readout electronics and CCD devices.

In general, higher speeds response speeds can be attained, the chopper maximally of a few kHz no longer constituting a limitation.

The system is highly sensitive, with low heat capacity pixels, and without any waste of received radiation corresponding to the duty cycle of the chopper.

As a consequence of its sensitivity, the system of the present invention permits use of full band absorption coatings for multiple band sensing on a single sensor device, as compared to conventional sensing mechanisms that are less likely to be able to operate at that lower absorbed energy level.

The system of the present invention permits fast thermal control of the pixel, according adaption for lighting conditions and avoidance of thermal runaway. Available thermal control also provides a controllable gain mechanism which is obtained by moving the operating region along the response curve of the material; reference FIG. 2.

The system of the present invention permits compensation for material and process variations by calibrating the response of each pixel; for example by changing the bias voltage used to charge the heat pulse capacitor.

In accordance with the preceding explanation, variations and adaptations of the chopperless operation of thermal infrared radiation sensors by applying heat pulses to thermally isolated pixel elements in accordance with the present invention will suggest themselves to a practitioner of the thermal sensor design arts. For example, an active cooling, as opposed to heating, pulse could be envisioned, such as by the use of TE cooler(s), for example. Such a use of coolers is unlikely to be as easily integrated as is the preferred, "micro hot plate", solution for applying heat pulses, and is, in particular, likely to greatly increase the pixel heat capacity. Still other means of active cooling have been proposes, for example based on the coherent absorption of light by appropriate materials. Clearly the present invention contemplates applying an a.c. thermal pulse to thermally isolated infrared radiation sensors, and this may be accomplished in many different specific manners, and with many different sensor materials operating in many different temperature ranges.

In accordance with these and other possible variations and adaptations of the present invention, the scope of the invention should be determined in accordance with the following claims, only, and not solely in accordance with that embodiment within which the invention has been taught.

What is claimed is:

1. A thermal sensor array for providing signals representative of the amount of thermal radiation in each of separate area portions of a scene producing thermal radiation which is incident upon the thermal sensor array, the array comprising:

a multiplicity of thermal-radiation-sensing pixel elements, the elements being sufficiently thermally isolated among and between each other so that each element comes to an equilibrium temperature that is proportional to thermal radiation incident upon the element from an associated portion of the scene, each element serving to produce an electrical signal in proportion to its temperature;

means for applying a heat pulse to each of the multiplicity of elements so that each element is momentarily driven to a new and higher temperature during the course of which change in temperature an electrical signal is produced;

wherein when heat pulses are applied to elements each at a different equilibrium temperature then the magnitudes of the electrical signal produced by each will vary in accordance with this difference;

wherein variations in temperature within the scene and in the separate area portions thereof are deducible from these differences, and are not required to be deduced from variations in the signal output of each of the elements at each of plural temperatures as is characteristic of conventional thermal sensor array where the electrical signals produced by the multiplicity of elements within the array are from time to time unrelated to temperature within the scene.

2. The thermal sensor array according to claim 1 wherein each of the multiplicity of therma-radiation-sensing pixel elements has, in accordance with the characteristics of the materials from which it is constructed, a signal output which varies greatly non-linearly with temperature, varying greatly non-linearly meaning that for a pyroelectric sensor used in pyroelectric mode the pyroelectric coefficient p varies by more than 50% per one degree Celsius, and for a pyroelectric sensor used in induced pyroelectric mode the dielectric permittivity varies by more than 20% per one degree Celsius.

3. The thermal sensor array according to claim 1 wherein each of the multiplicity of thermal-radiation-sensing pixel elements comprises:
   a pyroelectric sensor.

4. The thermal sensor array according to claim 1 wherein each of the multiplicity of thermal-radiation-sensing pixel elements comprises:
   a bolometer.

5. The thermal sensor array according to claim 1 wherein each of the multiplicity of thermal-radiation-sensing pixel elements produces an electrical signal that is non-linear with changes about its equilibrium temperature.

6. The thermal sensor array according to claim 5 wherein each of the multiplicity of thermal-radiation-sensing pixel elements producing the non-linear electrical signal with changes in equilibrium temperature comprises:
   a pyroelectric sensor used in pyroelectric mode coefficient that is so highly non-linear that the pyroelectric coefficient p varies by more than 50% per one degree Celsius.

7. The thermal sensor array according to claim 5 wherein each of the multiplicity of thermal-radiation-sensing pixel elements producing the non-linear electrical signal with changes in equilibrium temperature comprises:
   a pyroelectric sensor used in induced pyroelectric mode that is so highly non-linear that the dielectric permittivity varies by more than 20% per one degree Celsius.

8. The thermal sensor array according to claim 1 wherein the multiplicity of thermal-radiation-sensing pixel elements comprise:
   a common substrate; and
   a surface micromachined suspension to each pixel element which suspension offers low heat conductance to the substrate.

9. The thermal sensor array according to claim 1 wherein each of the multiplicity of thermal-radiation-sensing pixel elements comprises:
   KTN material.

10. The thermal sensor array according to claim 1 wherein the means for applying a heat pulse to an element comprises:
    a controllable source of thermal radiation.

11. A thermal sensor array for providing signals representative of the amount of thermal radiation in each of separate area portions of a scene producing thermal radiation which is incident upon the thermal sensor array, the array comprising:
    a multiplicity of thermal-radiation-sensing pixel elements, the elements being sufficiently thermally isolated among and between each other so that each element comes to an equilibrium temperature that is proportional to thermal radiation incident upon the element from an associated portion of the scene, each element serving to produce an electrical signal in proportion to its temperature; and
    a laser, serving as a controllable source of thermal radiation, applying a heat pulse to each of the multiplicity of elements so that each element is momentarily driven to a new and higher temperature during the course of which change in temperature an electrical signal is produced, the means;
    wherein when heat pulses are applied to elements each at a different equilibrium temperature then the magnitudes of the electrical signal produced by each will vary in accordance with this difference;
    wherein variations in temperature within the scene and in the separate area portions thereof are deducible from these differences.

12. A thermal sensor array for providing signals representative of the amount of thermal radiation in each of separate area portions of a scene producing thermal radiation which is incident upon the thermal sensor array, the array comprising:
    a multiplicity of thermal-radiation-sensing pixel elements, the elements being sufficiently thermally isolated among and between each other so that each element comes to an equilibrium temperature that is proportional to thermal radiation incident upon the element from an associated portion of the scene, each element serving to produce an electrical signal in proportion to its temperature, each of the multiplicity of thermal-radiation-sensing pixel elements comprising:
    a capacitor holding electrical charge; selectively electrically connected to
    a resistor;
    means for applying a heat pulse to each of the multiplicity of elements so that each element is momentarily driven to a new and higher temperature during the course of which change in temperature an electrical signal is produced, the means for applying a heat pulse to an element comprising:
    means for selectively gating the electrical charge of the element's capacitor through the element's resistor, therein to develop heat;
    wherein when heat pulses are applied to elements each at a different equilibrium temperature then the magnitudes of the electrical signal produced by each will vary in accordance with this difference;
    wherein variations in temperature within the scene and in the separate area portions thereof are deducible from these differences.

13. The thermal sensor according to claim 12 wherein the capacitor of each of the multiplicity of thermal sensing elements has a thermal constant that is in the same direction with increasing temperature as is a thermal constant of the element itself;
    wherein variations in the electrical signal output response to heat pulses of equal energy as are applied to two elements each at a different equilibrium temperature are magnified.

14. The thermal sensor array according to claim 12 wherein each of the multiplicity of thermal-radiation-sensing pixel elements further comprises:
    means for adjusting the voltage of the electrical charge held upon the capacitor in order to calibrate an individual pixel element, including in the resistor thereof, to account and to compensate for material and process variations in construction of the element.

15. A method of producing thermal image of a scene by use of a thermal sensor array having a plurality of thermal sensors, the method comprising:

uninterruptedly applying thermal radiation from a scene to an arrayed multiplicity of thermal-radiation-sensing pixel elements sufficiently thermally isolated among and between each other so that each element comes to an equilibrium temperature proportional to an associated portion of the scene, at which equilibrium temperature a first electrical signal will be produced at least momentarily;

momentarily applying an equal heat pulse greater than the thermal radiation from the scene to each of the arrayed multiplicity of thermal-radiation-sensing pixel elements so as to cause each such element to undergo a momentary excursion in temperature from its pre-existing temperature, during which temperature excursion a second electrical signal will be produced at least momentarily; and comparing magnitudes of the electrical signals produced by two elements each receiving the equal heat pulse as in indication of the magnitude of the equilibrium temperature of each such element, and thus of area portions of the scene corresponding to each such element.

16. A thermal imaging system for producing an electrical signal responsively to receipt of thermal radiation, the system comprising:

a plurality of thermal sensor elements, each mounted on a substrate from each it is thermally insulated so as come to an equilibrium temperature responsive to its receipt of an associated portion of the thermal radiation, each for producing an electrical signal representative of its equilibrium temperature; and a means for periodically temporarily heating each of the plurality of thermal sensor elements to greater than its equilibrium temperature so that each will momentarily come to a new temperature at which momentary time an electrical signal representative of the new temperature is produced.

* * * * *